United States Patent

[11] 3,610,338

[72] Inventors Bobby G. Harnsberger;
 Joy T. Payton, both of Houston, Tex.
[21] Appl. No. 885,643
[22] Filed Dec. 16, 1969
[45] Patented Oct. 5, 1971
[73] Assignee Teraco Inc.
 New York, N.Y.

[54] TREATMENT OF AN UNDERGROUND FORMATION
 24 Claims, No Drawings
[52] U.S. Cl. .................................................. 166/272,
 166/274, 252/8.55 D
[51] Int. Cl. ...................................................... E21b 43/22,
 E21b 43/24
[50] Field of Search ........................................... 166/305,
 274, 275, 273, 272, 306, 303; 252/8.55 D, 8.55 C,
 8.5 B

[56] References Cited
UNITED STATES PATENTS

| | | | |
|---|---|---|---|
| Re.23,277 | 5/1950 | Blair, Jr. et al. ............... | 252/8.55 E |
| 2,894,907 | 7/1959 | Newcombe et al. .......... | 252/8.55 C |
| 2,950,246 | 8/1960 | Hughes et al. ................ | 252/8.55 C |
| 3,236,306 | 2/1966 | Atwood ........................ | 166/305 R |
| 3,353,593 | 11/1967 | Boberg ......................... | 166/250 |
| 3,360,043 | 12/1967 | Braden, Jr. et al. ............ | 166/274 X |
| 3,502,578 | 3/1970 | Raifsnider .................... | 166/275 X |
| 3,514,399 | 5/1970 | Robinson ..................... | 252/8.5 C |

Primary Examiner—Stephen J. Novosad
Attorneys—Thomas H. Whaley, Carl G. Ries and James F. Young ABSTRACT: Method of stabilizing a clay-containing body by treatment with an imidazoline in water, alkanol or mixtures of alkanols.

TREATMENT OF AN UNDERGROUND FORMATION

The present invention relates to the treatment of clay containing formations. More particularly, this invention relates to a method of treating underground formations containing clays or claylike materials to increase the water permeability of the clay and/or to restore the water permeability of clays which have been previously damaged by water so that their water permeability has been materially reduced.

In modern day production of oil from underground formations, it has become fairly common practice to apply secondary recovery techniques to an oil containing formation in order to recover therefrom additional quantities of oil. Among the methods employed in secondary recovery operations mention is made of water flooding, steam injection, gas flooding and combinations thereof. One of the most serious problems encountered in secondary recovery operations with water flooding or steam injection procedures is that the underground oil containing formation also contains clay or claylike bodies associated therewith. Treatment of such a formation with water or steam generally results in swelling of the clay by absorption of the water with the concomitant result that the water permeability of the formation is materially decreased. The decrease in the water permeability of the formation to water results in the loss of the oil contained therein from being recovered by secondary recovery operations.

It is known from U.S. 2,761,836 that clay containing bodies can be stabilized by treatment with substituted ammonium ions derived from heterocyclic nitrogen compounds selected from the group consisting of histamine, 2,4-dimethylpiperidine, 2,2'-bipyridine, 2,2'-dipyridylamine, 5-vinyl-2-methylpyridine, N-(3-aminopropyl) morpholine and 3-(2-aminoethyl) indole.

This patent teaches that the parent basic nitrogen compounds from which the substituted ammonium ions are derived have essentially no clay stabilizing action and are unsatisfactory materials for use as treating agents to stabilize clay since clays treated therewith were easily dispersed or resulted in aqueous solutions having a colloidal appearance.

It has now been found that a clay containing formation can be effectively treated to improve the water and/or steam permeability of the clay with a prescribed class of imidazolines as hereinafter more fully described in an aqueous or an organic solvent, such a lower alkanol or a mixture of lower alkanols. It has been found that treatment of an underground clay containing formation with a solution of the prescribed class of imidazolines in a solvent materially increases the permeability of the clay containing formation to subsequent water treatment, and in addition, that treatment in accordance with the method of the present invention also restores the water permeability of formations which have been previously damaged by contact with water. The prescribed class of imidazolines include 2-imidazoline, the substituted 2-imidazolines, such as 2-methyl-2-imidazoline, 2-methyl-1-hydroxyethyl-2-imidazoline and mixtures thereof as well as a prescribed class of salts thereof.

The prescribed class of imidazoline salts useful in the present invention include the hydrogen halides such as the 2-imidazoline hydrochloride, hydrobromide, and nitrate, acetate and mixtures thereof.

The method of the present invention has particular applicability in secondary recovery operations wherein water flooding or steam injection is employed as the secondary driving force to recover the oil from the formation. In such a secondary recovery operation for example, water flooding, the injection water is introduced into the formation through an injection well under pressure and forced out into the oil containing formation. The pressure maintained on the water injected into the formation displaces or forces the oil to move toward the producing well which is located relatively distant from the injection well. At the producing well the driven oil is recovered by conventional means.

In carrying out the method of the present invention it has been found desirable to inject the prescribed class of imidazolines in the solvent into the formation from the injection well and to maintain the injected treating solution in contact with the clayey portion of the underground formation for a period of time such as from about 1 to about 7 days to effect stabilization to the clay materials in contact with the treating solution. Thereafter the secondary recovery injection fluid can be introduced into the formation in a conventional manner which is well known in the art. If the permeability of the formation to the secondary recovery injection fluid is reduced as is evidenced by a reduction in the flow of oil from the producing well, the flow of secondary recovery injection fluid into the injection well is discontinued. There is introduced into the injection well the treating solution of the present invention in an amount sufficient to restore the permeability of the formation to the injection fluid. This restoration treatment is carried out in the same manner as described hereinabove. Subsequent to the restoration treatment the secondary recovery injection fluid flow into the injection well can be initiated again.

The concentration of the prescribed class of imidazolines in the solvent can vary from about 0.5percent up to about 65percent by weight, dependent on salt solubility in the solvent, but for the most satisfactory results a concentration between about 5 percent and about 20 percent have been found to be most effective. Employment of the prescribed class of imidazolines in a concentration of below about 0.5 percent is impractical since relatively large amounts of such a dilute treating solution would be required to bring the treating agent into contact with the clay in and about the injection well so as to increase the clay permeability. Concentrations above about 25–30 percent are impractical also from a cost basis as no improvement in permeability is attained by use of such high concentrations. A preferred concentration for the imidazolines is from about 5 percent from about about 20 percent by weight. In the treatment of an underground formation by the present invention methanol is an effective solvent since it is relatively low in cost and easily available.

TEST PROCEDURE

A 10 percent by weight solution of the imidazoline or a salt thereof was prepared. There was added to a 50 ml. portion of the solution 4 grams of a water-sensitive clay known by the trade name "Magcogel," with stirring. The resulting suspension was allowed to stand for about 5–15 minutes, centrifuged and the liquid decanted.

The thus treated clay was water washed about 15 times with stirring using 50 ml. portions of distilled water. Thereafter the washed clay was centrifuged and the wash liquid removed therefrom. The resulting treated clay was immersed in a 50 ml. portion of distilled water for about three days, then it was removed, water washed about five times, centrifuged, the liquid decanted therefrom and the clay then suspended in another 50 ml. portion of distilled water. The suspended clay sample was subjected to a daily water wash, centrifuged, liquid decantation treatment and reimmersion in distilled water for 9 additional days.

Daily visual observation of the treated clay was conducted during the test period. No evidence of clay swelling was observed over the 13 day test period.

EXAMPLES I—VI

The following solutions of the imidazoline and salts were tested in the above manner:

I —10 percent by weight 2-imidazoline in methanol

II —10 percent by weight 2-imidazoline hydrochloride in methanol

III —10 percent by weight 2-methyl-2-imidazoline in methanol

IV —10 percent by weight 2-methyl-2-imidazoline hydrochloride in methanol

V —10 percent by weight 2-methyl-2-imidazoline in water

VI —10 percent by weight 2-methyl-1-hydroxyethyl-2-imidazoline in water (test period 5 days only).

COMPARATIVE EXAMPLE A

As evidence of the need to use relatively low molecular weight imidazolines in the method of the present invention, another test was conducted using a 10 percent by weight solution of 2-heptadecyl-1-hydroxyethyl-2-imidazoline hydrochloride in methanol to treat the clay.

The clay sample swelled during treatment thus indicating its ineffectiveness in the method of the present invention.

I claim:

1. Method of stabilizing a clay containing body which comprises contacting said body with an imidazoline selected from the group consisting of 2-imidazoline, 2-methyl-2-imidazoline, 1-hydroxyethyl-2-methyl-imidazoline, the corresponding hydrochlorides, hydrobromides, nitrates, acetates, and mixtures thereof in a solvent in an amount sufficient to stabilize said clay containing body, said solvent being a member selected from the group consisting of water, a lower alkanol and a mixture of lower alkanols.

2. Method as claimed in claim 1 wherein said imidazoline is 2-imidazoline.

3. Method as claimed in claim 1 wherein said imidazoline is 2-imidazoline hydrochloride.

4. Method as claimed in claim 1 wherein said imidazoline is 2-methyl-2-imidazoline.

5. Method as claimed in claim 1 wherein said imidazoline is 2-methyl-2-imidazoline hydrochloride.

6. Method as claimed in claim 1 wherein said imidazoline is 1-hydroxyethyl-2-methyl-2-imidazoline.

7. Method as claimed in claim 1 wherein said solvent is water.

8. Method as claimed in claim 1 wherein said lower alkanol is methanol.

9. Method as claimed in claim 1 wherein said lower alkanol is ethanol.

10. Method as claimed in claim 1 wherein said lower alkanol is a mixture of methanol and ethanol.

11. Method as claimed in claim 1 wherein said clay containing body is adjacent a wellbore, said imidazoline is 2-methyl-2-imidazoline and said solvent is water.

12. Method as claimed in claim 1 wherein said clay containing body is adjacent a wellbore, said imidazoline is 2-methyl-2-imidazoline and said solvent is methanol.

13. Method of recovering oil from an oil bearing underground formation containing clay wherein a displacement fluid selected from a group consisting of water, steam and mixtures thereof is applied to said formation and oil is recovered therefrom which comprises introducing a treating solution consisting of an imidazoline selected from the group consisting of 2-imidazoline, 2-methyl-2-imidazoline, 1-hydroxyethyl-2-methyl-2-imidazoline, the corresponding hydrochlorides, hydrobromides, nitrates, acetates and mixtures thereof in a solvent into said formation, contacting said clay with said treating solution, thereafter introducing said displacement fluid into said formation under pressure to force said treating solution through the formation and recovering oil from said formation, said solvent being a member selected from the group consisting of water, a lower alkanol and a mixture of lower alkanols.

14. Method as claimed in claim 13 wherein said imidazoline is 2-imidazoline.

15. Method as claimed in claim 13 wherein said imidazoline is 2-imidazoline hydrochloride.

16. Method as claimed in claim 13 wherein said imidazoline is 2-methyl-2-imidazoline.

17. Method as claimed in claim 13 wherein said imidazoline is 2-methyl-2-imidazoline hydrochloride.

18. Method as claimed in claim 13 wherein said imidazoline is 1-hydroxyethyl-2-methyl-2-imidazoline.

19. Method as claimed in claim 13 wherein said solvent is water.

20. Method as claimed in claim 13 wherein said lower alkanol methanol.

21. Method as claimed in claim 13 wherein said lower alkanol is ethanol.

22. Method as claimed in claim 13 wherein said lower alkanol is a mixture of methanol and ethanol.

23. Method as claimed in claim 13 wherein said clay-containing body is adjacent a well bore, said imidazoline is 2-methyl-2-imidazoline and said solvent is water.

24. Method as claimed in claim 13 wherein said clay-containing body is adjacent a well bore, said imidazoline is 2-methyl-2-imidazoline and said solvent is methanol.

PO-1050
(5/69)

UNITED STATES PATENT OFFICE
CERTIFICATE OF CORRECTION

Patent No. 3,610,338            Dated October 5, 1971

Inventor(s) Bobby G. Harnsberger and Joy T. Payton

It is certified that error appears in the above-identified patent and that said Letters Patent are hereby corrected as shown below:

On page 2, the assignee "Teraco Inc." should read --Texaco Inc.--.

In the list of References cited, "Re. 23,277" should read --Re. 23,227--.

Column 2, line 34, delete "from about" second occurrence and substitute --to--.

Claim 20, line 2, before "methanol" insert --is--.

Signed and sealed this 28th day of March 1972.

(SEAL)
Attest:

EDWARD M. FLETCHER, JR.
Attesting Officer

ROBERT GOTTSCHALK
Commissioner of Patents